Feb. 7, 1933. R. CHILTON 1,896,133
UNIVERSAL JOINT
Filed Oct. 4, 1928
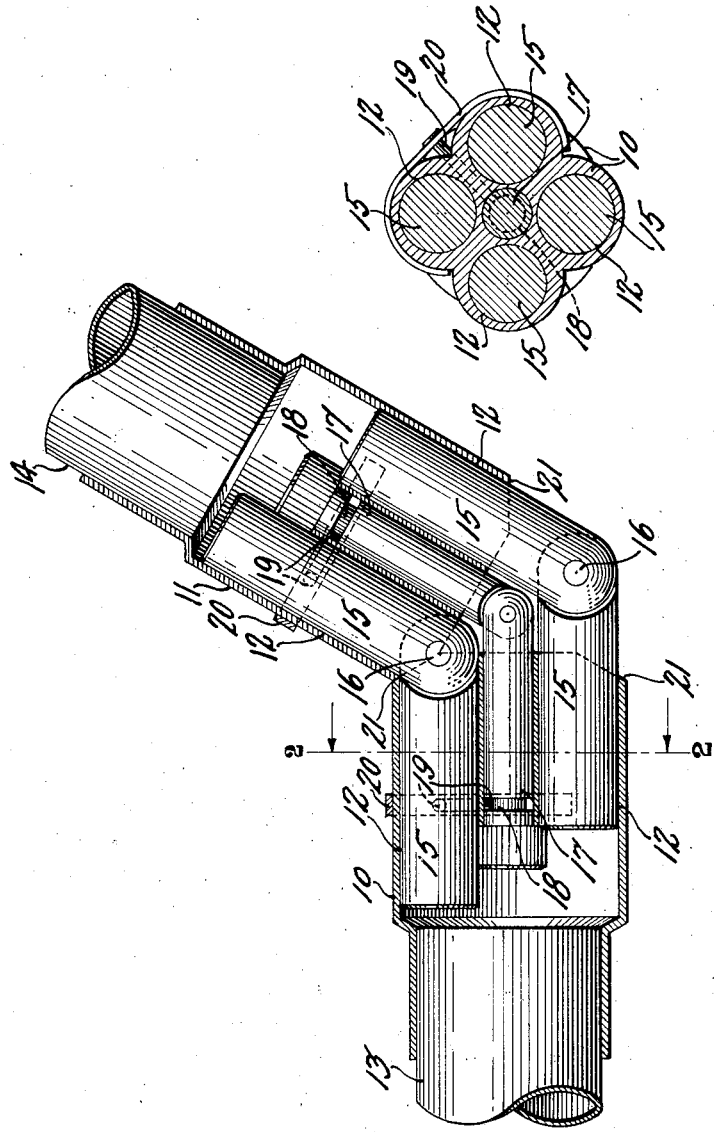
ROLAND CHILTON
INVENTOR
BY
ATTORNEY Patented Feb. 7, 1933

1,896,133

UNITED STATES PATENT OFFICE

ROLAND CHILTON, OF KEYPORT, NEW JERSEY, ASSIGNOR, BY MESNE ASSIGNMENTS, TO ECLIPSE MACHINE COMPANY, OF ELMIRA HEIGHTS, NEW YORK, A CORPORATION OF NEW YORK

UNIVERSAL JOINT

Application filed October 4, 1928. Serial No. 310,256.

This invention relates to universal joints and comprises a new and improved structure whereby a very large angle between the connected shafts may be realized.

It is a well known characteristic of the conventional "Hook's" coupling or trunnion joint which comprises an intermediate member having pivotal connections with each of the connected shafts, that large angles between the shafts are unobtainable because of mechanical interferences of the parts and because of the large variations from unitary speed ratio during each revolution. It is impossible for constructional reasons to approach a 90 degree angle between shafts with such conventional joints and, were such a disposition obtainable, one of the trunnion axes would then be in line with one of the shafts and no drive could be transmitted under any approach to this condition.

For large angles, it is necessary to use two or more conventional joints and it is then necessary to support the shafts against lateral deflections by outside bearings or by some form of universal or ball and socket connection of the joints between the ends of the connected shafts.

A specific object of the present invention is to provide a universal joint wherein there shall be no change in the velocity ratio and no mechanical interferences even though the angle be taken up to or beyond 90 degrees.

A further object of this invention is to provide a single joint which will maintain theoretically accurate operation even at extreme angles and which will itself support the shafts against relative lateral motion.

When the support of one shaft from another is effected by means such as a ball and socket joint, the maximum possible angular deflection between the shafts is limited by the necessity of a substantial shank to support the ball member, which shank will be seen to interfere with the socket before extreme angles can be reached. This limitation to angular motion is avoided in the clevis type of connection which, however, is only flexible in one direction, i. e., about the axis of the clevis pin and would accordingly defeat universality in the joint except for the special disposition of the present invention whereby the axes of the pivot pins always remain normal to the plane of the shaft axes, the connected shaft ends rotating about the intermediate members which have planetary motion without other rotation.

It is a characteristic of the joint of the present invention that there is no oscillation of the pin or clevis connections whilst the shaft angle is maintained at any specific figure; the only movement at these pin joints occurring whilst the shaft angle is being changed. The motion is confined to a rotation and plunge of the intermediate members within the driving heads, the amount of rotation being the same as that of the shafts and the degree of plunge increasing with an increase of the angle between the shafts.

The joint of this invention, with the preferred form of clevis joint between the intermediate members, is not suitable for very small angles between the shafts, i. e., for conditions approaching true alignment, because there is a tendency for the intermediate members to rotate with the shaft heads thus turning the clevis joints sidewise to the direction of the flexure which would destroy the connections. As soon as a substantial angle is obtained however the geometry of the structure is such that the intermediate members are positively restrained to a fixed attitude with the pivot pins normal to the plane of the shaft throughout the entire revolution.

When the preferred clevis pin joint as shown is employed and the associated structure is such that the shafts might otherwise accidently be brought into close alignment, flats may be provided on the male member of the clevis to abut the base of the slot in the other member and so afford a positive stop against too close approach to axial alignment of the shafts.

Various other objects and advantages of the invention will be obvious from an inspection of the accompanying drawing and a careful consideration of the following particular description and claims of the form of mechanism embodying my invention.

In the drawing:

Figure 1 is a side elevation of the invention shown partly in section.

Figure 2 is a cross section taken on the line 2—2 of Fig. 1 looking in the direction indicated by the arrows.

With reference to the drawing, 10 and 11 designate two similar shaft ends or joint heads having circumferentially spaced cylindrical bores 12 parallel to the axes of the respective shafts 13 and 14 to which the heads may be secured by any suitable means.

Slidably and rotatably mounted in these bores 12 are the intermediate plunging members 15 having clevis connections secured by pins 16. It will be seen that the angle between all of the connected intermediate members 15 is at all times the same as that between the shafts, so that no motion at the clevis joints occurs except as the angle between the shafts is changed. Thus for any fixed angle between the shafts, each intermediate member may consist of one integral piece having its ends fabricated at the corresponding angle, but the preferred showing illustrates a construction whereby the shaft angle is variable.

It will also be seen that the drive is transmitted by the bending stiffness of the plunging intermediate members which will in themselves restrain the shafts from relative lateral deflection and, therefore, avoid the necessity for shaft bearings or for added pivotal connections between the shafts for this purpose.

For the purpose of restraining the shafts 13, 14 from axial separation, a central intermediate member 17 is provided with any suitable means to locate each end axially with respect to its associated shaft head. In the present instance grooves 18 engageable by demountable pins 19 are illustrated for this purpose; said pins being secured by the spring clamps 20.

The joint connecting the two portions of the central intermediate member may be of the same pin and clevis construction as for the driving members 15 although smaller sizes will be adequate in this case, as no driving load is transmitted, the function of these center members being merely to maintain the shafts in the desired axial relation without resource to outside bearings.

The joint illustrated in the drawing is shown at an attitude of 60 degrees, and to reduce the overhang of the driving members 15, the shaft heads 10 and 11 are bevelled off as at 21 to contact at this angle. For a shaft angle of 90 degrees for example, the angle of this bevel would be 45 degrees, which would increase the overhang of the driving plungers to more than necessary for the smaller angle illustrated.

It should be understood that there are no torsional loads on the driving plungers, the drive being transmitted by bending action on these members about which the shaft heads rotate; the motion of the plungers being planetary.

The geometry of this joint is such that the joint pins 16 of the intermediate members or driving plungers 15 always remain in one plane, i. e., the plane bisecting the angle between the shafts. This condition is inherent from the disposition of the parts, and, as is well-known to those skilled in the art, is a necessity to obtain constant velocity ratio in a universal joint. It is a failure of the intermediate members to remain in bisection of the angle between the shaft axes that accounts for the variations in velocity ratio in the common double trunnion universal joint.

Variations may be resorted to within the scope of the invention and portions of the improvements may be used without the others, whilst not departing from the spirit of the invention.

Having thus described my invention, I claim:—

1. In a universal joint, means for retaining a pair of shaft heads in their proper axial spaced relation comprising members pivotally attached together at one of their ends in the plane of the joint and extending through axial bores in the shaft heads, said members having grooves intermediate their ends and positioned within the heads, a pin extending transversely through the shaft head and entering the groove of its respective member to hold the same against longitudinal movement.

2. In a universal joint, means for retaining a pair of shaft heads in their proper axial spaced relation comprising members pivotally attached together at one of their ends in the plane of the joint and extending through axial bores in the shaft heads, said members having a groove intermediate their ends and postioned within one of said heads, a pin extending transversely through the head and having one end entering said groove to hold said members against longitudinal movement, and a spring clip attached at the other end of the pin for removably securing the pin in place, said clamp having inwardly turned ends adapted to grip said head.

3. In a universal joint, a pair of shaft heads having their external surface of a corrugated contour and a bore at the axis of rotation, restraining members pivotally attached together at one of their ends in the plane of the joint and extending through the axial bores respectively, a pin passed through the shaft head having one end engaging the restraining member, and a spring clip attached to the other end of the pin which grips the ribs of the corrugated external surface and holds the pin in place.

4. In a universal joint comprising in combination, a pair of shaft ends each having exterior corrugated surfaces, an axial bore and a plurality of circumferentially spaced bores, plungers extending from each of the circumferentially spaced bores and pivotally connected together at the mid plane of the joint, readily removable restraining members in the axial bores connected at one of their ends in the plane of the joint, a pin passed transversely through the shaft end, said pin having one end in engagement with the restraining member to hold the same against longitudinal movement, a spring clip attached to the other end of the pin, which engages the exterior corrugated surface of the shaft end and holds the pin in place.

5. In a universal joint, a pair of shaft ends each having a plurality of bores parallel to the axes of the respective shafts, driving plungers in said bores and adapted for rotation and plunging within the bores, a restraining member rotatable in bores in said shaft ends, and yieldingly held locking means for removably attaching said member to one of said shafts ends, said locking means including a member extending transversely into said shaft end, and resilient means urging said member toward the axis of rotation of said shaft end.

6. A universal joint connecting a pair of shafts and comprising a plurality of circumferentially spaced plungers pivotally connected together in a common plane bisecting the angle formed by the axis of said shafts, a pair of centrally disposed members mounted axially within the respective shafts and pivotally connected in said common plane, a pin extending transversely into one of said shafts to engage one of said centrally disposed members to hold the same against longitudinal movement, and resilient means for maintaining said pin in engagement therewith.

Signed at Keyport, in the county of Monmouth, and State of New Jersey this 1st day of October 1928.

ROLAND CHILTON.